United States Patent [19]

Watjer et al.

[11] Patent Number: 4,738,481

[45] Date of Patent: Apr. 19, 1988

[54] OVERHEAD CONSOLE OF A VEHICLE

[75] Inventors: Sheldon J. Watjer, Holland; Ronald A. Dykstra, Rockford, both of Mich.

[73] Assignee: Prince Corporation, Holland, Mich.

[21] Appl. No.: 18,691

[22] Filed: Feb. 25, 1987

Related U.S. Application Data

[62] Division of Ser. No. 829,400, Feb. 13, 1986, Pat. No. 4,674,789.

[51] Int. Cl.⁴ ............................................... B60R 7/04
[52] U.S. Cl. .................................................. 296/37.8
[58] Field of Search ............................ 296/37.7, 37.8; 224/42.42 R

[56] References Cited

U.S. PATENT DOCUMENTS

| | | | |
|---|---|---|---|
| 1,964,339 | 7/1934 | Brassell | 296/37.7 |
| 4,023,856 | 5/1977 | DeRees | 296/97 R |
| 4,149,749 | 4/1979 | Canal | 296/97 R |
| 4,241,870 | 12/1980 | Marcus | 296/37.7 |
| 4,280,730 | 7/1981 | Turner | 296/97 G |
| 4,312,533 | 1/1982 | Jardin et al. | 296/214 |
| 4,469,365 | 9/1984 | Marcus et al. | 296/37.7 |
| 4,558,899 | 12/1985 | Chu et al. | 296/97 G |

FOREIGN PATENT DOCUMENTS 2952193  7/1981  Fed. Rep. of Germany ..... 296/37.8

Primary Examiner—Robert P. Song
Attorney, Agent, or Firm—Price, Heneveld, Cooper, DeWitt & Litton

[57] ABSTRACT

The sun screen and console of the present invention provides a panel which is slideably mounted to the vehicle and movable fore and aft within the vehicle in a generally horizontal plane between a retracted position and a forwardly extended position which provides cover above the passenger's and/or driver's seat. To the forward edge of the sliding panel, there is pivotally mounted a visor which is movable between a raised stored position and a lowered use position. The invention also contemplates a console comprising a cantilever beam mount which, in the preferred embodiment, comprises a pair of parallel spaced beams which are mounted in a cantilevered fashion to the rear roof area of the vehicle and which extend forwardly under a transparent forward roof. In a preferred embodiment, the beams provide guide slots for the pair of sliding sun screen panels.

8 Claims, 4 Drawing Sheets

OVERHEAD CONSOLE OF A VEHICLE

This is a division of application Ser. No. 829,400, filed Feb. 13, 1986, now U.S. Pat. No. 4,674,789.

BACKGROUND OF THE INVENTION

The present invention pertains to a sun shield system for a vehicle and particularly one which includes a sliding panel having a pivoted visor mounted on one edge.

A recent car design concept incorporates an integral windshield and transparent roof section which extends from the normal windshield area rearwardly over the passenger's and driver's seat to present a transparent cover for the driver and front seat passenger. Although providing a protected and yet unique open feeling when driving or riding in the vehicle, it is sometimes desirable to protect and shield the occupants of the vehicle from sunlight. In order to provide a protective and/or covering shield which does not detract from the desirable open appearance of the vehicle, a radically different sun shield system was conceived which selectively provides the desired shading and/or covering without detracting from the aesthetics of the vehicle.

Also, with a glass windshield and roof member, it is not practical to support a conventional overhead center console from the somewhat fragile glass structure. Thus, a new concept was conceived for providing a console structure to the vehicle.

SUMMARY OF THE PRESENT INVENTION

The sun screen and console of the present invention attractively provides the desired protection by providing a panel which is slideably mounted to the vehicle and movable fore and aft within the vehicle in a generally horizontal plane between a retracted position in which it is enclosed within a pocket at the rear headliner area of the vehicle and a forwardly extended position which provides cover above the passenger's and/or driver's seat. To the forward edge of the sliding panel, there is pivotally mounted a visor which is movable between a stored position adjacent the sliding panel and generally parallel thereto, and a lowered use position pivoted away from the panel in a position extending downwardly from the top portion of the windshield.

The invention also contemplates a console comprising cantilever beam means which, in the preferred embodiment, comprise a pair of parallel spaced beams which are mounted in a cantilevered fashion to the rear roof area of the vehicle and which extend forwardly under the transparent roof. In a preferred embodiment, the beams are formed to define guide and support means for a pair of sliding sun screen panels. The console may include instrumentation such as a digital electronic compass of the type disclosed in U.S. Pat. No. 4,546,551 and other convenient accessories.

These and other features, objects and advantages of the present invention will become apparent upon reading the following description thereof together with reference to the accompanying drawings in which:

DETAILED DESCRIPTION OF THE PREFERRED EMBODIMENT

Figure 1:
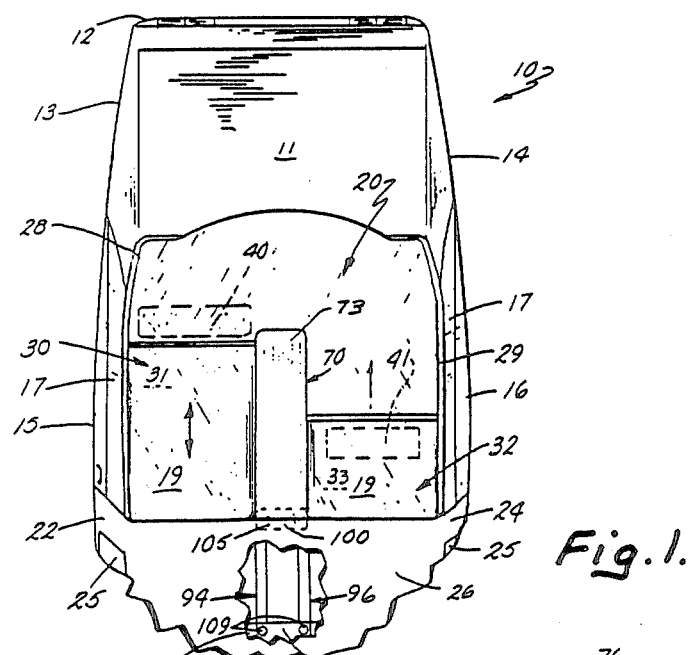
FIG. 1 is a fragmentary top plan view of a vehicle embodying the present invention.

Referring initially to FIG. 1, there is shown a vehicle such as an automobile 10 embodying the system of the present invention. The vehicle 10 can be any type of automobile having a front end 12, front left and right side fenders 13 and 14 and driver and passenger access doors 15 and 16, each with windows 17. A unique integral windshield and roof 20 is provided which includes a forward downwardly curved windshield area 18 and a upper rearward and generally horizontally extending roof section 19 which extends over the driver and passenger seats located inwardly from and ajacent the side doors 15 and 16. The windshield-roof 20 extends at its lowered forward edge from behind the hood 11 of the vehicle 10 to an area behind the front doors 15 and 16 to the frame support structure commonly known as the B pillars 22 and 24. From there the rear edge of transparent roof 20 is sealed to a sheet metal rear roof 26 which extends over the rear seat area of the car which may include rear side windows 25. A suitable sealing material is provided at the interface of the translucent windshield-roof member 20 and the sheet metal roof 26 and the other body parts at the peripheral junction of this integral curved member 20 with the vehicle. Transparent member 20 can be made of an acrylic material such as Plexiglas, although it is contemplated that in mass production it will be integrally formed of a laminated glass material conventially used for vehicle windows.

Figure 2:
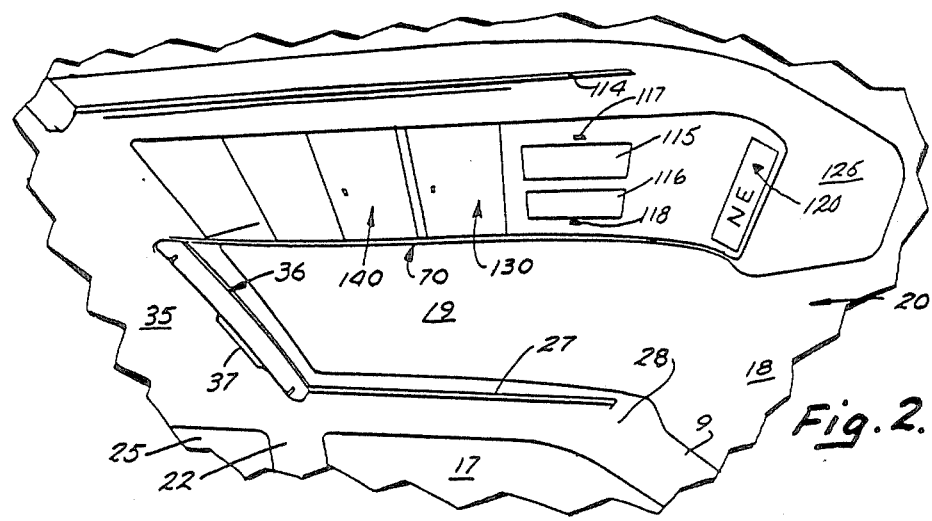
FIG. 2 is an enlarged fragmentary perspective view of a portion of the interior of the vehicle shown in FIG. 1 with the sun screen of the present invention shown in the stored position.
Figure 3:
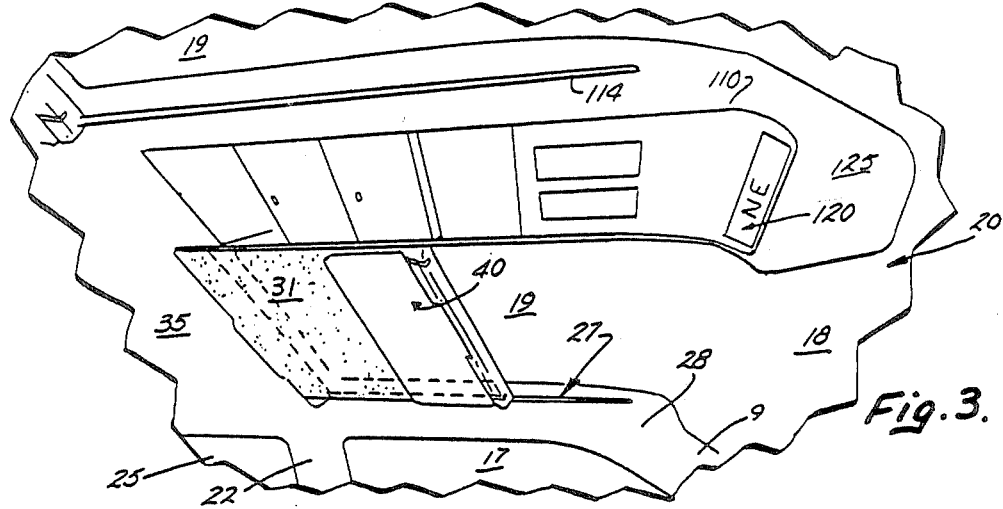
FIG. 3 is a fragmentary perspective view of the structure shown in FIG. 2 with the sun screen in the intermediate position.
Figure 4:
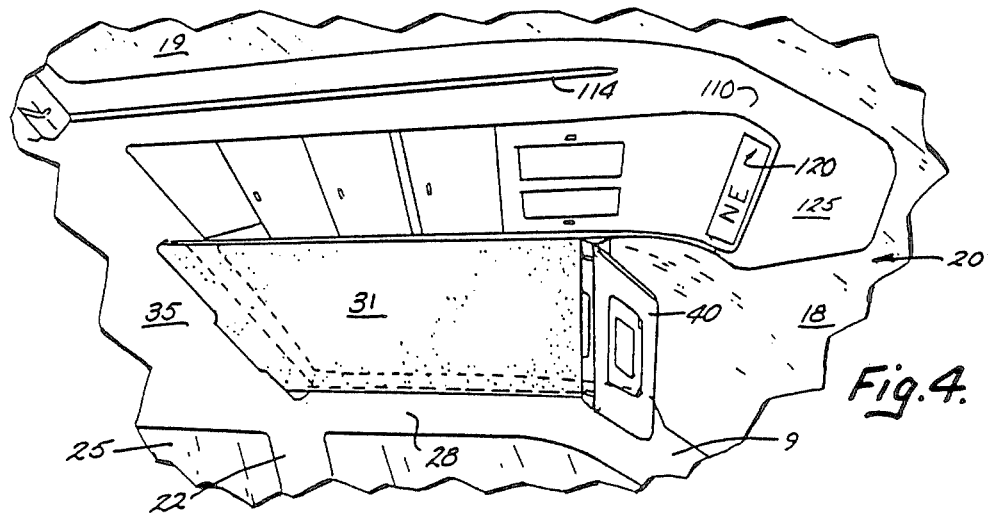
FIG. 4 is a fragmentary perspective view of the structure shown in FIG. 3 showing the sun screen in a third position.

As can be seen in FIGS. 2 through 4, which show the interior of the vehicle looking upwardly toward the upper left corner of the vehicle above the driver's seat, the integral windshield-roof 20 provides a very open appearance for the vehicle occupants, while at the same time providing protection against the elements.

A central console 70 extends forwardly between the front seats of the vehicle and immediately adjacent the lower surface of section 19 of the windshield-roof 20 and in contact therewith, although as will be explained below in greater detail, the center console 70 is not supported by the glass or acrylic member 20 and is mounted in a cantilevered fashion to the roof 26 of the vehicle. In the preferred embodiment, the central area of the glass member 20 above console 70 is painted black on the inner surface to such that the inner mechanical and electrical components within the console 70 cannot be seen from the exterior of the vehicle through the otherwise transparent member 20. Although providing an extremely open and pleasant ambiance for the vehicle interior, on some occasions it is desirable to provide more privacy by enclosing the roof sections 19 above the driver and passenger seats as well as providing protection against direct sunlight over these areas and the normal upper areas of the windshield section 18 of member 20. To provide such a sun shielding and/or covering function, the unique sun shield system of the present invention is provided and now described.

The sun shield system of the present invention includes two shield assemblies 30 and 32 (FIG. 1), each of which are substantially identical. The assemblies 30 and 32 include a generally horizontally extending longitudinally slideable panel member 31 and 33, respectively, to which there is pivotally mounted at each of the forward edges thereof a visor 40 and 41. In FIG. 1, which is a view looking through the transparent roof of the vehicle, the left side assembly 30 is shown in its fully extended position with the visor 40 lowered to a use position as also illustrated in FIG. 4. The passenger side panel, on the other hand, is shown in a partially extended position. Each of the panels are slideably mounted under the roof sections 19 between guide and support means formed in console 70 and associated guide and support means formed in the vehicle side beams 28 and 29. Since each of the sun shield assemblies 30 and 32 are substantially identical, only assembly 30 is described in detail and is shown in FIGS. 2–4. As can be appreciated, these panels move between their extended position, as seen in FIG. 4, and a retracted concealed position, as illustrated in FIG. 2, between the outer sheet metal roof 26 of the vehicle and the interior headliner 35 of the vehicle, it being understood that typically there will be a space between the interior typically fabric headliner 35 and the outer sheet metal roof 26 defining a forwardly opening pocket 36 into which the assemblies 30 and 32 can be retracted when not in use.

Figure 5:
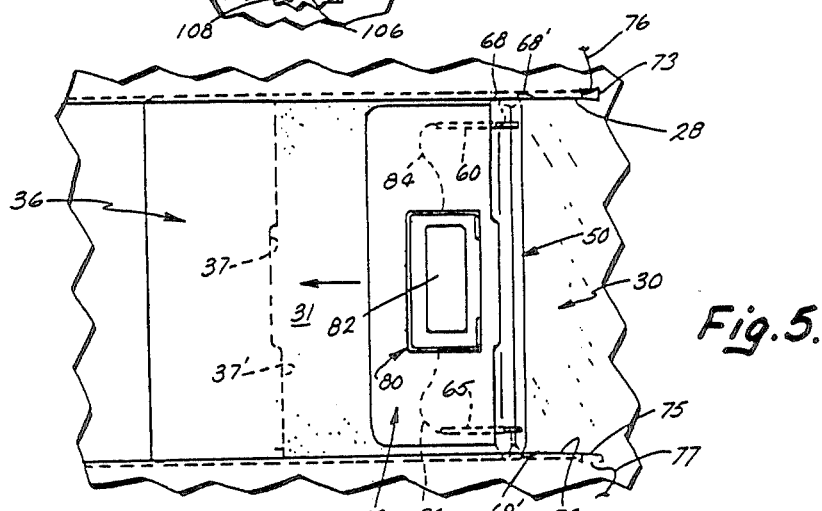
FIG. 5 is an enlarged fragmentary top plan view, partly in schematic form, of the present invention.

Each of the sun shield assemblies 30 and 32 include a relatively large planar and generally rectangular panel such as panel 31 associated with assembly 32 and shown in greater detail in the top plan view of FIG. 5.

Coupled to panel 31 is a visor 40 which is pivotally mounted to the leading edge 38 (FIG. 8) of panel 31 by means of a mounting bar 50 and a pair of L-shaped pivot arms or rods 60 and 65. The mounting of visor 40 to panel 31 is described in greater detail below; however, it permits the visor to move between a position adjacent panel 31 and generally parallel thereto, as illustrated in FIGS. 3 and 5, for storage, as shown in FIG. 2, within pocket 36 to intermediate positions, as shown in FIG. 3, and pivot outwardly away from panel 31, as shown in FIG. 4, for use of the visor over the upper windshield area 18 of member 20. As best seen in FIGS. 5, 6, 7 and 9, panel 31 includes opposite edges 39 and 42 which extend within guide and support means associated with the vehicle support structure 28 and the console 70. The roof support beam 28 will internally include a generally U-shaped channel member 27 (FIG. 7) which is suitably secured to the vehicle frame as by welding or the like and which includes a conventional U-shaped sliding seal insert 27' which is typically employed, for example, along window edges and the like for permitting the glass windows to slide within the window channels of door frames in vehicles. Material 27' is thus in wide commercial use as a sliding seal and protection member. Such material 71 also lines channel 72 for edge 42 of panel 31, as best seen in FIG. 9.

Channels 27 and 72 extend in generally parallel relationship from near the forward edge 73 (FIG. 1) of console 70 to a distance rearwardly equal to at least the longitudinal length of panel 31 such that the panel can be fully retracted by manually sliding the panel rearwardly within pocket 36. Typically, the lower surface of panels 31 and 33 will be upholstered or covered with a flocking material which provides an appearance to the selectively exposed undersurface of the panel corresponding to that of the vehicle's interior upholstery. The edges 39 and 42, however, will not be covered with fabric to permit relatively easy sliding motion within the liner members 27' and 71 associated with channels 27 and 72. The leading lower edge of pocket 36 in the headliner 35 adjacent the pocket opening includes a recess 37 to allow the assembly 30 to fully retract within the pocket 36, as seen in FIG. 2, into a position substantially flush with the forward edge 37' of pocket 36. Recess 37 provides fingerhold access to a mounting bar 50 which also provides a handle located at the leading edge of the assembly 30 for manually extending the assembly from the stored position as shown in FIG. 2. Panels 31 and corresponding panel 33 on the right side of the vehicle are made of a suitable heat resistant polymeric material such as polycarbonate.

Figure 6:
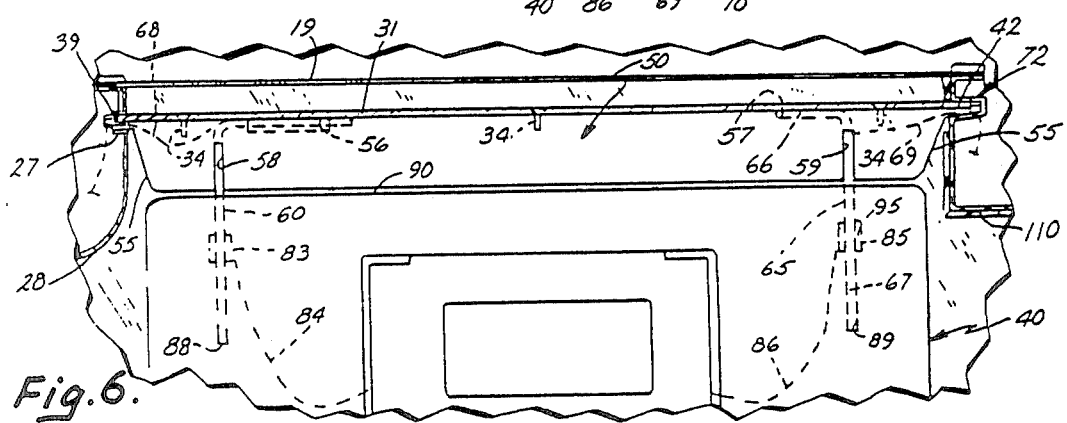
FIG. 6 is an enlarged fragmentary cross-sectional view of the system of the present invention taken along section lines VI—VI of FIG. 4.
Figure 7:
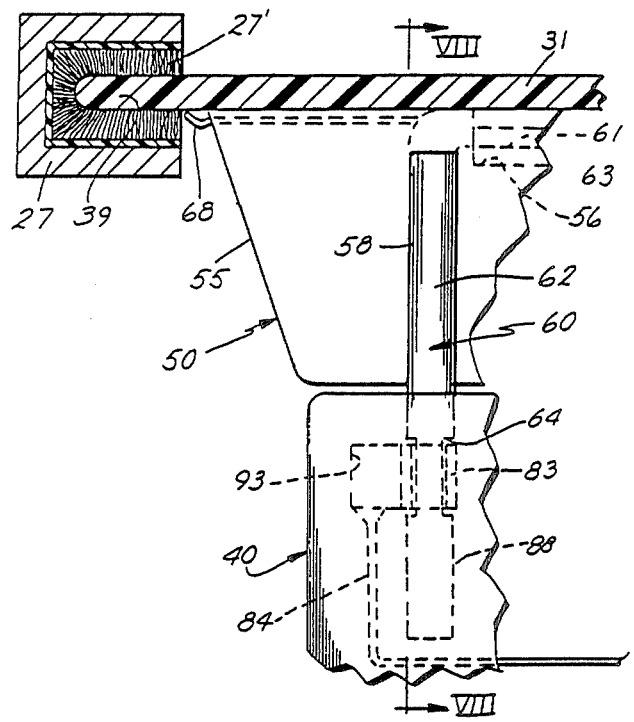
FIG. 7 is a greatly enlarged fragmentary view of a portion of the structure shown in FIG. 6.
Figure 8:
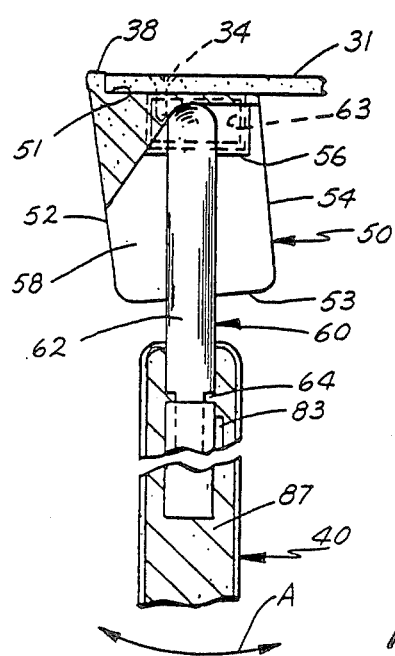
FIG. 8 is a cross-sectional view of the structure shown in FIG. 7 taken along section lines VIII-VIII of FIG. 7.
Figure 9:
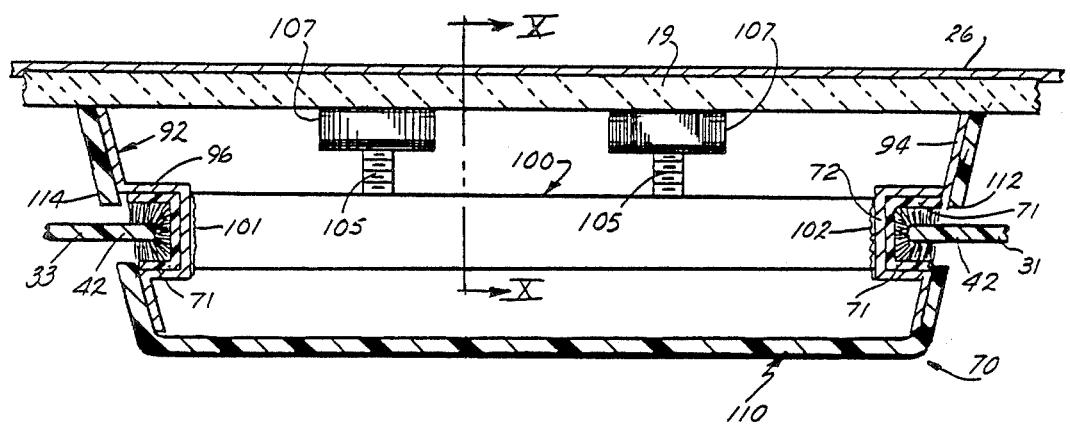
FIG. 9 is a fragmentary cross-sectional view of the cantilevered center console taken along section lines IX—IX of FIG. 1.

Attached to the leading edge 38 of panel 31 by a plurality of spaced screws 34, as best seen in FIGS. 6 and 8, is the mounting bar 50 which serves to anchor the visor 40 to the relatively thin panel 31 and secure the L-shaped visor pivot rod 60 and 65 to the panel. Three such screws 34 are represented in FIG. 6, although more than three may be employed; and if desired, an adhesive material can be employed to couple the polymeric bar 50 to the leading edge of the panel 31. As see in FIG. 8, the upper surface of bar 50 has a rectangular recess 51 formed therein into which the leading edge 38 of panel 31 is seated. The front wall 52 of member 50 is downwardly and rearwardly tapered to provide a neat and trim appearance to the assembly when stored, as shown in FIG. 2, while the bottom surface 53 is likewise tapered upwardly from front to rear such that the trailing wall 54 will readily insert into pocket 36 since its height is somewhat less than the overall height of the forward edge 52. Similarly, as best seen in FIGS. 6 and 7, the side walls 55 of bar 50 are inwardly tapered from top to bottom to provide clearance between the vehicle members 28 and 29 and console 70.

The mounting bar 50 includes two generally rectangular recesses 56 and 57 formed downwardly through the top surface 51 thereof for receiving one leg 61 and 66 of each of the L-shaped pivot rods 60 and 65 respectively. Communicating with each of these rectangular apertures are slots 58 and 59 (FIGS. 6-8) which permit the downwardly depending legs 62 and 67 of the pivot rods 60 and 65 to extend therethrough such that the visor can pivot in an arc as represented by arrow A in FIG. 8 of about 130°. Rectangular aperture 56 is somewhat larger than aperture 57 to accommodate a torque fitting 63 of the type disclosed in U.S. Pat. No. 4,500,131 which cooperates with flats formed on leg 61 to tend to urge the visor 40 to a snap-up stored position as illustrated in FIGS. 2, 3 and 5. Thus, the torque fitting 63 fits over end 61 of rod 60 and is held in stationary relationship with respect to bar 50 by its nesting within rectangular aperture 56 as best seen in FIG. 8. The fitting 63 can be of the type disclosed in the above-identified patent, the disclosure of which is incorporated herein by reference. Leg 62 of rod 60 and the corresponding leg 67 of rod 65 extend significantly downwardly and below the lower surface 53 of bar 50 to allow these extending legs to snap-fit and lockably extend within the visor 40.

Each of the visor rods 60 and 65 are coupled to a respective polarity of the vehicle's power supply system through a contact arrangement including conductors 68 and 69 (FIGS. 5–7) which are coupled to legs 61 and 66, respectively, of the pivot rods by suitable electrical connectors. The remote ends of conductors 68 and 69 extend to conventional spring-loaded contact 68' and 69' (FIG. 5) mounted to the edges 39 and 42 of the panel 31 to extend into guide tracks 27 and 72 to engage electrical contacts 73 and 75, respectively, at the forward end of the respective tracks. When slide 31 is in its forwardmost position, as shown in FIG. 3, contacts 73 and 75 will be coupled to the conductors 68 and 69, respectively, and supply operating power through the conductive pivot rods 60 and 65 for the purpose of supplying power to the visor 40. Contacts 68', 69', 73 and 75 are shown schematically in FIG. 5 and are spring-loaded leaf-type contacts. Conductors 76 and 77 are coupled to contacts 73 and 75, respectively, and extend through the A pillars 9 (FIGS. 2–4) of the vehicle to the vehicle's power supply system to provide a positive supply voltage to one of the pivot rods 60 of each of the visors 40 and 44, while the remaining conductor toward the console 70 of the vehicle is coupled to ground through conductor 77 and contacts 69' and 75. Naturally, when the visor is in a stored raised position, as shown for example in FIGS. 3 and 5, the power will be unavailable to the visor since the interconnecting pivot rods are not activated. Thus, movement of the sliding panel selectively provides operating power to the visors which are now described.

Each of the visors 40 and 44 are preferably of the illuminated vanity mirror type including a covered illuminated vanity mirror package 80 having a cover 82 over an illuminated vanity mirror. Actuation of the cover will actuate lights associated with the mirror when power is available through conductors 84 and 86 (FIGS. 5 and 6) which are coupled to conductive rods 60 and 65 through locking electrical clips 83 and 85, with clip 83 being shown in detail in FIGS. 7 and 8. The illuminated vanity mirror package 82 which is inserted into the body of each of the visors 40 and 44 can be of the general type disclosed in U.S. Pat. No. 4,227,242, the disclosure of which is incorporated herein by reference.

The visor body comprises a polymeric core 87 having a pair of apertures 88 and 89 formed therein from the top edge 90 for receiving legs 62 and 67 of rod 60 and 65 respectively. Captured within the split-molded polymeric core 87 which can be molded, for example, of a polypropylene material as disclosed, for example, in U.S. Pat. No. 3,926,470, are rectangular recesses 93 and 95 for anchoring snap-lock conductive clips 83 and 85, respectively, within the core and in coaxial alignment with the apertures 88 and 89 respectively. The legs 62 and 67 of rods 60 and 65, respectively, include annular recess 64, as best seen in FIGS. 7 and 8, of a reduced diameter such that as the rod legs 62 and 67 are inserted into apertures 88 and 89, the rods extend through the clips 83 and 85 deforming the spring-loaded arms of the fuse cartridge-type clips until the reduced diameter recess 64 aligns with the clips. When this occurs, the clips snap-lock around the reduced diameter section, making electrical contact with the conductive rods 60 and 65 and holding the rod ends 62 and 67 within the body of the visor. Thus, the rods provide a mechanical means of pivotal attachment of the visors to the respective sliding panels 31 and 33 and also provide an electrical connection between the members. The visors may not include the illuminated vanity mirror package 80, in which case the clips 83 and 85 serve only to mechanically lock the rod ends in place.

Figure 10:
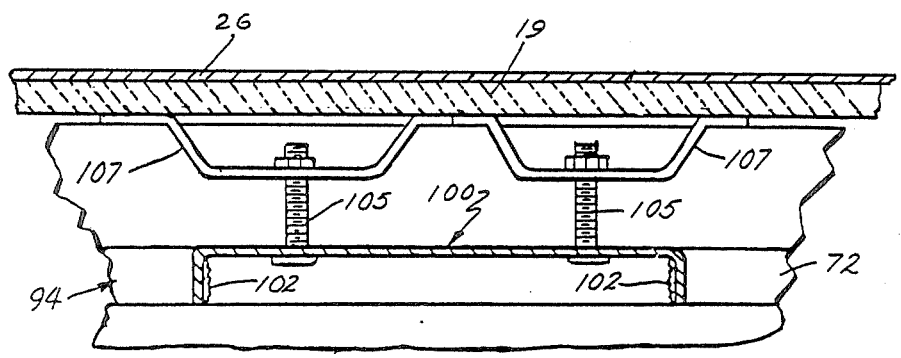
FIG. 10 is a fragmentary cross-sectional view of a portion of the console not shown to scale and taken in the direction illustrated by section line X—X in FIG. 9.

The cantilevered beam construction of console 70 is best seen in FIGS. 1, 9 and 10, and referring specifically to FIG. 9, includes a pair of steel beams 92 and 94 which integrally include generally rectangular channel means 96 and 72 for receiving the channel lining material 71 which is secured thereto by means of suitable adhesive and which slideably receives the edges 42 of panels 31 and 33.

In order to provide a tapered and sleek appearance to the console 70, the beams typically have a lower inwardly converging inclined shape, as seen in FIG. 9, with the channels extending in a generally horizontal plane. The beams extend from near the front end 73 (FIG. 1) of the console rearwardly beyond the B pillar area typically toward the rear window of the vehicle. The beams are joined in at least one location by a U-shaped cross beam 100 which is welded at junctions 101 and 102 to beams 92 and 94. As seen in FIG. 10, beam 100 is a relatively wide beam which, in the preferred embodiment, is located in alignment with the B pillars 22 and 24 of the vehicle and as shown in phantom schematic form in FIG. 1. Cross member 100 is secured to the roof support beams 107 in the B pillar area by suitable fastening means such as four bolts 105 shown in FIGS. 1, 9 and 10. Beams 92 and 94 may also be supported at the end of the beams remote from end 73 by a second cross beam 106 (FIG. 1), again welded to hold the beams 92 and 94 in parallel spaced relationship with the second beam 106 also being shaped like beam 100 and welded to the longitudinally extending beams 92 and 94. Cross member 106 likewise is secured to a sheet metal cross member 108 of the car's integral roof construction by means of fastening bolts 109 as seen in FIG. 1. Attached to the beams 92 and 94 in a conventional manner is a molded polymeric housing 110 defining the outward configuration of the console which housing includes longitudinally extending slots 112 and 114 (FIG. 9) permitting the panels 31 and 33 to fit within channels 72 and 96. Housing 110 may be made up of a polycarbonate integrally molded to provide the decorative housing as well as additional support for the beams when the housing is attached thereto. The beams, when attached to the vehicle, hold the console 70 upwardly against the transparent roof section 19, and thus the console 70 does not apply any weight whatsoever to the glass or acrylic roof. If desired, a suitable foam insulation material can be placed between the upper end of housing 110 around its peripheral contact with the roof to prevent rattling.

Console 70 may include a variety of vehicle accessories inserted between the structural beams and in the housing. Such accessories may include, as seen in FIGS. 2–4 for example, a pair of map reading lamps 115 and 116 operated by push-button switches 117 and 118 respectively. Additionally, the console may include a digital electronic compass and temperature display system 120 which can be of the type described in U.S. Pat. No. 4,546,551. Behind the map reading lamps 115 and 116, there may be provided a garage door opening compartment and housing 130 of the type described in U.S. Pat. Application Ser. No.605,583, entitled GARAGE DOOR OPENING TRANSMITTER COMPARTMENT, filed on Apr. 30, 1984. Behind the garage door opening compartment 130, there is provided a sun glass storage compartment 140 in the embodiment of console 70 as shown.

The housing 110 of console 70 can be covered with a suitable upholstery material 125 to conform it to the general decor of the vehicle, if desired, or can be pebblegrained plasic without a upholstery material. By providing the cantilevered beam construction, no load is presented by the mounting of the console to the glass roof and windshield member 20, and in fact, the cantilevered console can be mounted such that a slight upward pressure is provided on the glass for providing center support as in the preferred embodiment. The center console beams likewise define guide and support means for the inner edges of each of the sliding visor panels and provides a variety of helpful vehicle accessories.

It will become apparent to those skilled in the art that various modifications to the preferred embodiment of the present invention can be made without departing from the spirit or scope thereof as defined by the appended claims.

The embodiments of the invention in which an exclusive property or privilege is claimed are defined as follows.

1. A console support system for an overhead console for a vehicle comprising:
   a pair of horizontally extending elongated support beams extending forwardly and rearwardly in a vehicle and means for securing a rear portion of said beams to the vehicle roof for supporting said beams in a cantilevered manner from said rear portion;
   cross member means for coupling said beams together near said rear portion with said beams extending in generally parallel spaced relationship to one another; and
   a housing coupled to said beams and including one or more vehicle accessories positioned between said beams and located in spaced relationship from said cross member means.

2. The apparatus as defined in claim 1 wherein said cross member means comprises a pair of cross members coupled to said beams in spaced relationship from one another.

3. The apparatus as defined in claim 2 wherein said housing defines a cover for said beams.

4. The apparatus as defined in claim 3 wherein said beams include channel means integrally formed therein and facing outwardly to define guide tracks along opposite sides of said housing.

5. A console support system and an overhead console for a vehicle comprising:
   a pair of horizontally extending parallel spaced elongated support beams;
   means coupling said beams together near one end thereof and for securing only said one end of said beams to the roof of a vehicle such that said beams are coupled in a cantilevered fashion to said roof; and
   a console including a housing mounted to and covering said beams, said console including one or more vehicle accessories positioned between said beams at a location remote from said one end.

6. The apparatus as defined in claim 5 wherein said one end of said beams is located toward the rear of the vehicle.

7. The apparatus as defined in claim 6 wherein said housing includes slot means extending in parallel relationship to and in alignment with said beams and wherein said beams define channel means aligned with said slots for supporting vehicle accessories therein.

8. The apparatus as defined in claim 7 wherein said console includes at least one storage compartment.

* * * * *